United States Patent
Pai

(10) Patent No.: US 6,530,394 B2
(45) Date of Patent: Mar. 11, 2003

(54) ON-OFF SWITCH STRUCTURE OF A GAS TANK

(76) Inventor: I-Chih Pai, No. 16, Lane 263 Chiang-Kung Rd., Ta-Chia Township, Taichung Hsien (TW)

( * ) Notice: Subject to any disclaimer, the term of this patent is extended or adjusted under 35 U.S.C. 154(b) by 0 days.

(21) Appl. No.: 10/053,321

(22) Filed: Jan. 23, 2002

(65) Prior Publication Data

US 2002/0112766 A1 Aug. 22, 2002

(30) Foreign Application Priority Data

Feb. 21, 2001 (TW) ........................... 90202719 U

(51) Int. Cl.[7] .............................................. F16L 37/40
(52) U.S. Cl. .................................. 137/454.2; 251/149.6
(58) Field of Search ..................... 137/614.05, 614.04, 137/614.03, 613, 454.2; 251/149.6, 149.1

(56) References Cited

U.S. PATENT DOCUMENTS 5,553,638 A * 9/1996 Home ................ 251/149.6 X
5,582,201 A * 12/1996 Lee et al. ............ 251/149.6 X

* cited by examiner

*Primary Examiner*—Kevin Lee

(57) ABSTRACT

A gas tank on-off switch structure includes a main body and a leakproof member which is structurally independent of the main body and is detachably fastened to the main body. The main body is connected with the interior of the gas tank. The leakproof member is formed of a fastening body, an elastic member, a plug, and a locating body. The fastening body is fastened to the main body and a gas pipe connector. The elastic element and the plug are located in the fastening body in conjunction with the locating body. The plug serves to prevent the gas leak in conjunction with the elastic element.

2 Claims, 8 Drawing Sheets

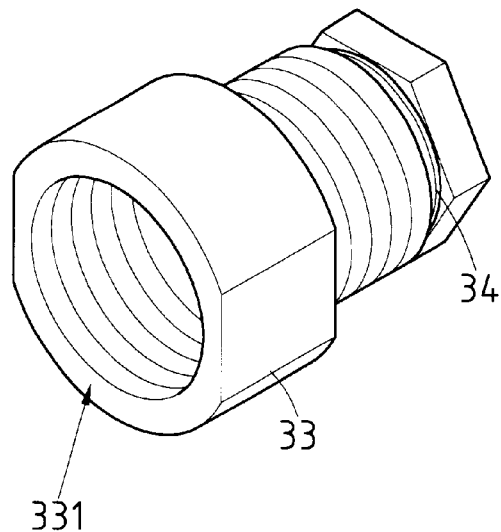
FIG.8-A
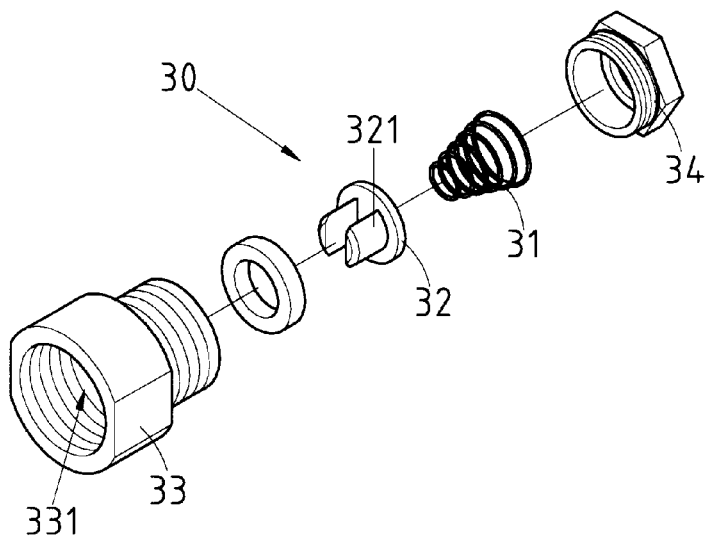
FIG.8-B

ON-OFF SWITCH STRUCTURE OF A GAS TANK

BACKGROUND OF THE INVENTION

1. Field of the Invention

The present invention relates generally to a gas tank access and more particularly to an on-off switch structure of the gas tank.

2. Description of Related Art

As shown in FIGS. 1 and 2, a gas tank on-off switch 10 of the prior art comprises a main body 11 and a leakproof device. The main body 11 is provided in the interior with a retaining hook 12, a locating inember 13, a control bolt 14 disposed through the retaining hook 12 and the locating member 13. A rotary knob 19 is mounted on the outer end of the control bolt 14. The bottom of the main body 11 is fastened with a valve 15 in which a spring 16, a guide tube 17, and a stop member 18 are disposed. The prior art switch 10 is leakproof; nevertheless it is rather complicated in construction and is therefore not cost-effective. In addition, the leakproof device is not structurally independent of the main body 11. As a result, the defective leakproof device must be replaced along with the main body 11 which is still in a good working condition.

BRIEF SUMMARY OF THE INVENTION

The primary objective of the present invention is to provide a gas tank on-off switch structure which is simple in construction and cost effective.

The on-off switch structure of the present invention comprises a main body and a leakproof member. The main body is provided with a rotary handle fastened therewith for controlling the flow of gas. The main body is in communication with the interior of the gas tank. The leakproof member is fastened with the main body and is formed of an elastic element, a plug, a fastening body, and a locating body. The plug is disposed in a through hole of the fastening body in conjunction with the elastic element. The fastening body is fastened to the main body such that the through hole of the fastening body is in communication with the interior of the gas tank. The leakproof member is structurally independent of the main body.

The features and the functions of the present invention will be more readily understood upon a thoughtful deliberation of the following detailed description of the present invention with reference to the accompanying drawings.

BRIEF DESCRIPTION OF THE SEVERAL VIEWS OF THE DRAWINGS

FIG. 8A shows a perspective view of the leakproof member of the present invention.

FIG. 8B shows an exploded view of the leakproof member of the present invention.

DETAILED DESCRIPTION OF THE INVENTION

Figure 1:
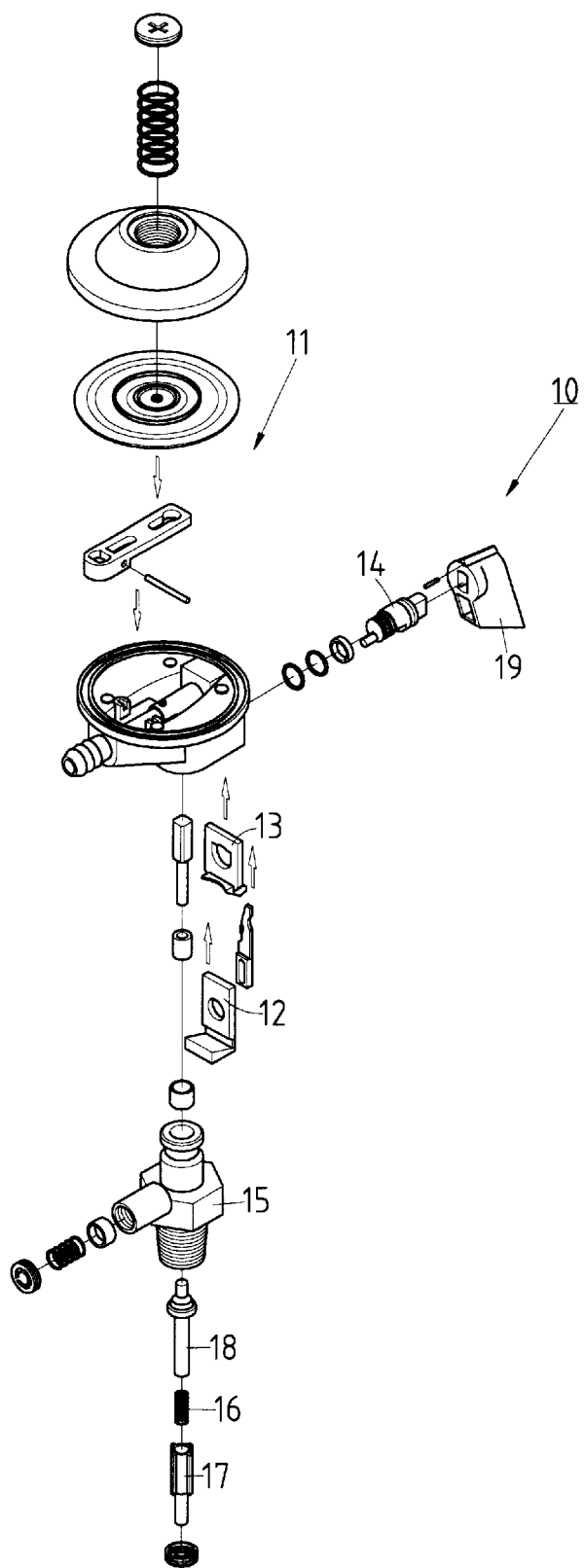
FIG. 1 shows an exploded view of a gas tank on-off switch the prior art.
Figure 2:
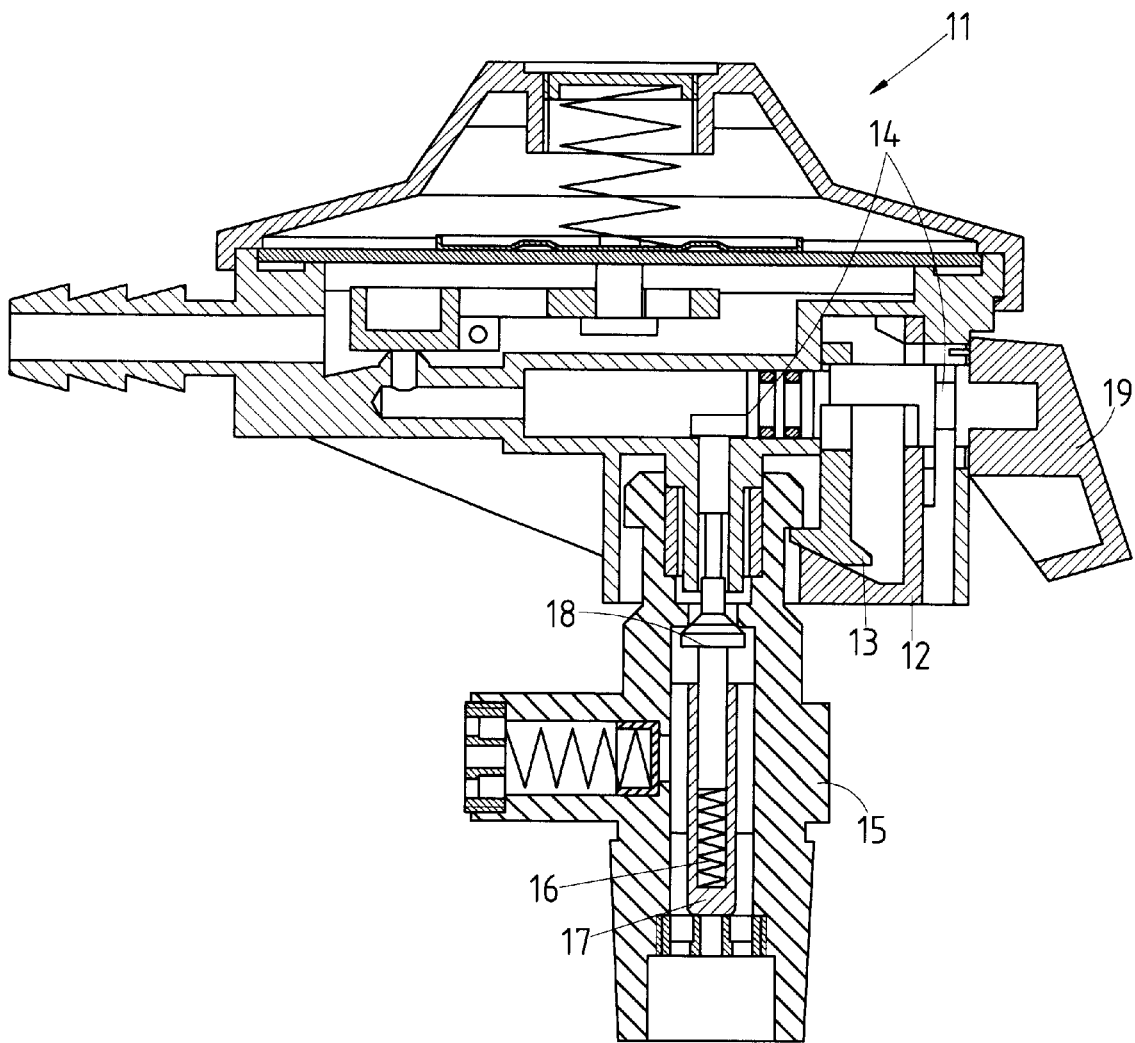
FIG. 2 shows a sectional schematic view of the prior art gas tank on-off switch.
Figure 3:
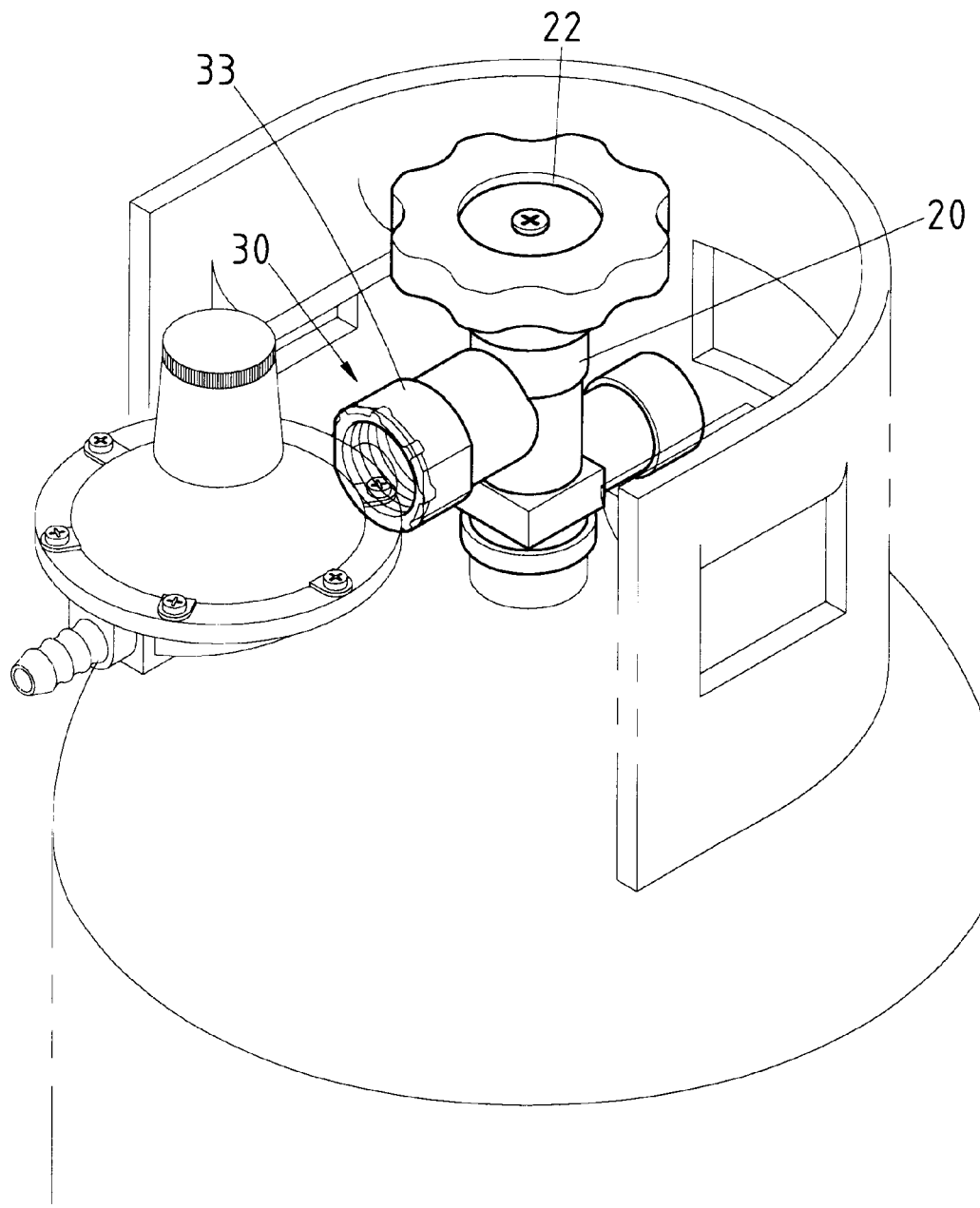
FIG. 3 shows a perspective view of the present invention.
Figure 4:
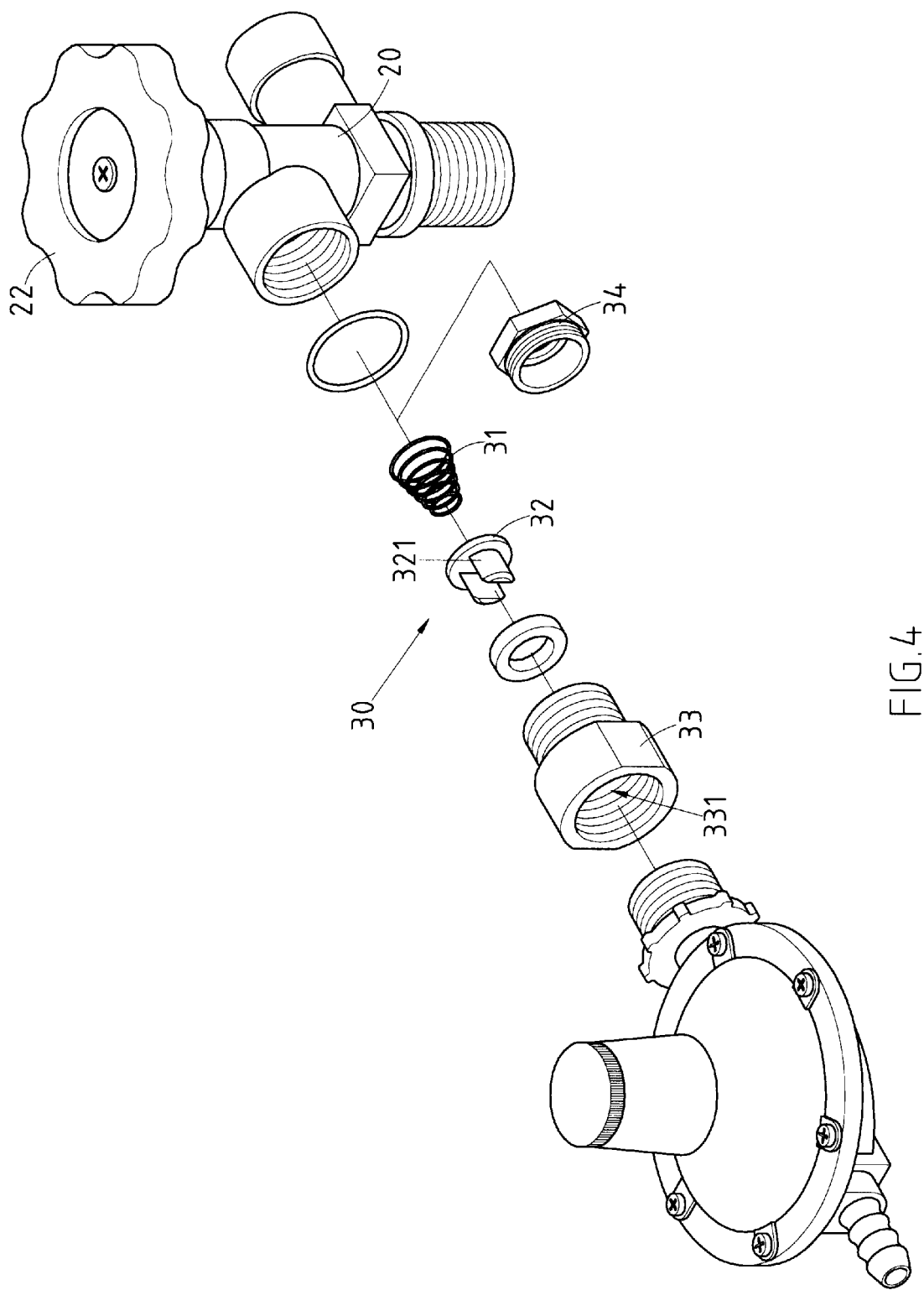
FIG. 4 shows an exploded view of the present invention.
Figure 5:
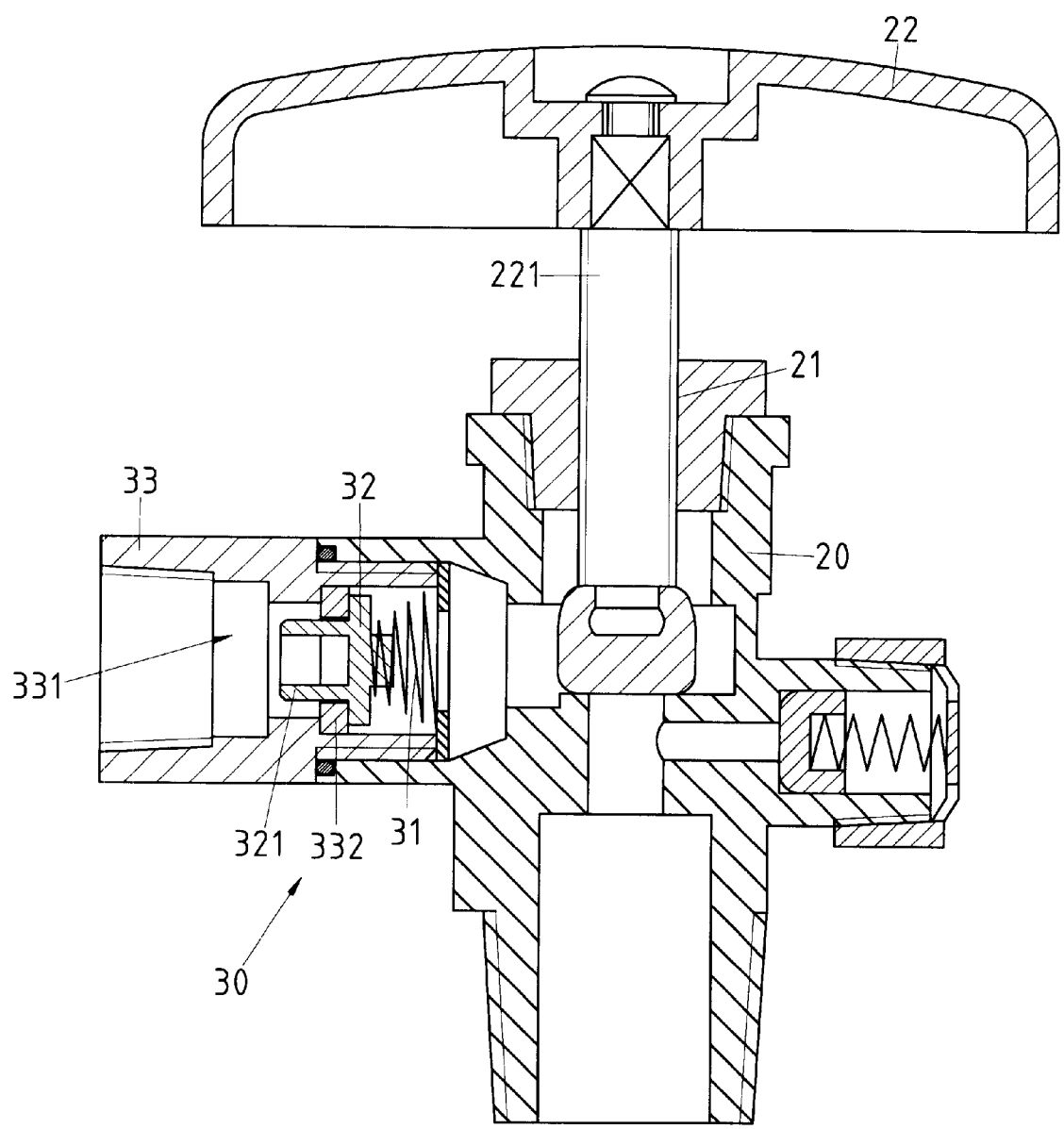
FIG. 5 shows a sectional schematic view of the present invention.

As shown in all drawings provided herewith, with the exception of FIGS. 1 and 2, a gas tank on-off switch structure of the present invention comprises a main body 20 and a leakproof member 30. The leakproof member 30 is structurally independent of the main body 20 and can be thus replaced or installed independently.

The main body 20 is provided in the top end with a fastening hole 21 for fastening a control rod 221 of a rotary handle 22 which is used to control the gas flow. The main body 20 is fastened at the bottom end with a gas tank such that the main body 20 is in communication with the interior of the gas tank.

The present invention is characterized by the leakproof member 30, which is formed of an elastic element 31, a plug 32, a fastening body 33, and a locating body 34.

The elastic element 31 and the plug 32 are disposed in the fastening body 33 in conjunction with the locating body 34. The fastening body 33 is provided with a through hole 331 in which the plug 32 is stopped. The fastening body 33 is fastened to the main body 20. The plug 32 has a protruded end 321 which is put through a stop edge 332 of the through hole 331. The elastic element 31 is a coil spring. The gas pipe connector is fastened with the through hole 331 of the fastening body 33 such that the protruded end 321 of the plug 32 is pushed by the gas pipe connector to form a gap through which the gas flows into the gas pipe for distributing gas to various gas implements.

Figure 6:
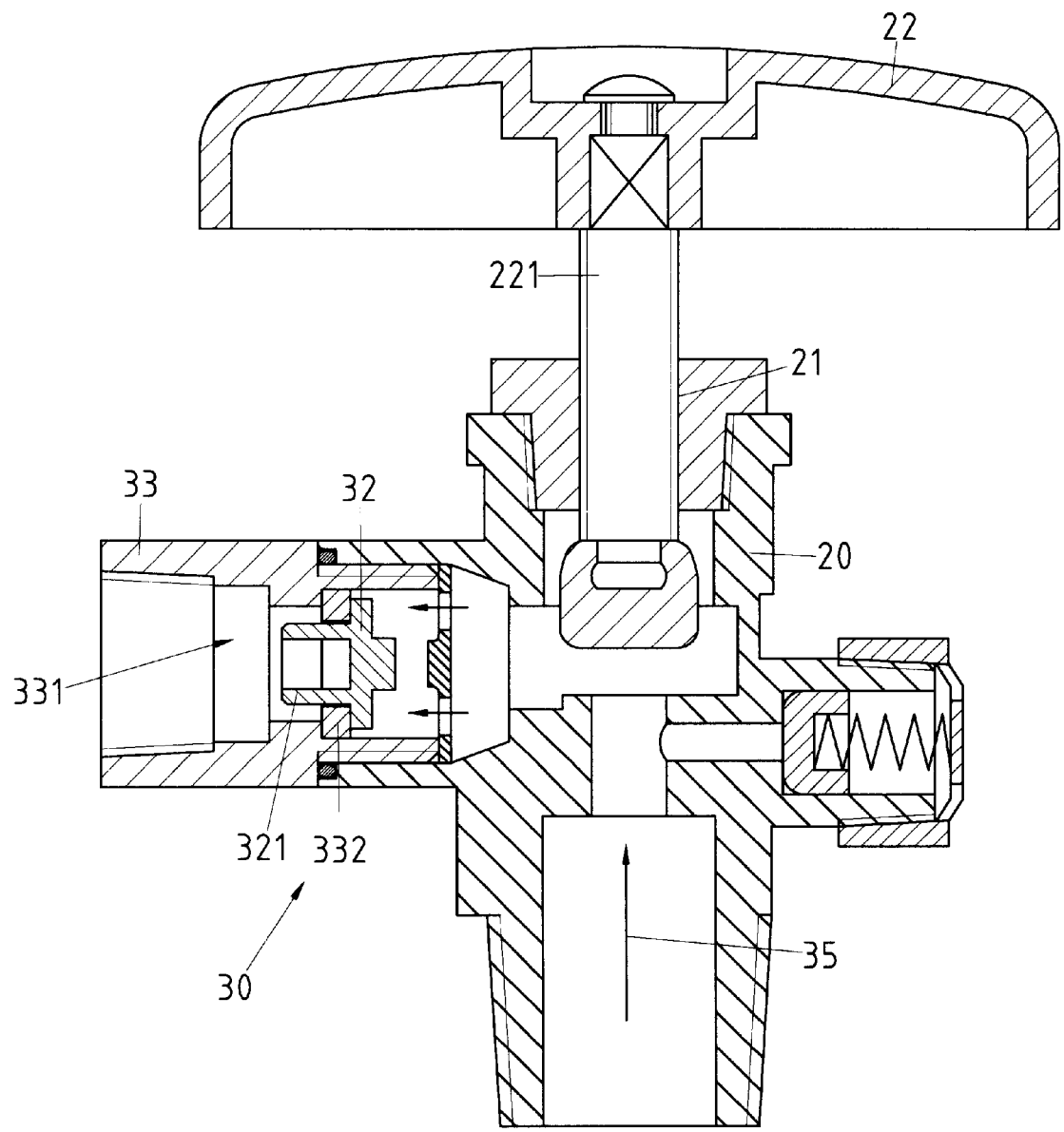
FIG. 6 shows a sectional schematic view of the present invention which is embodied in another form.
Figure 7:
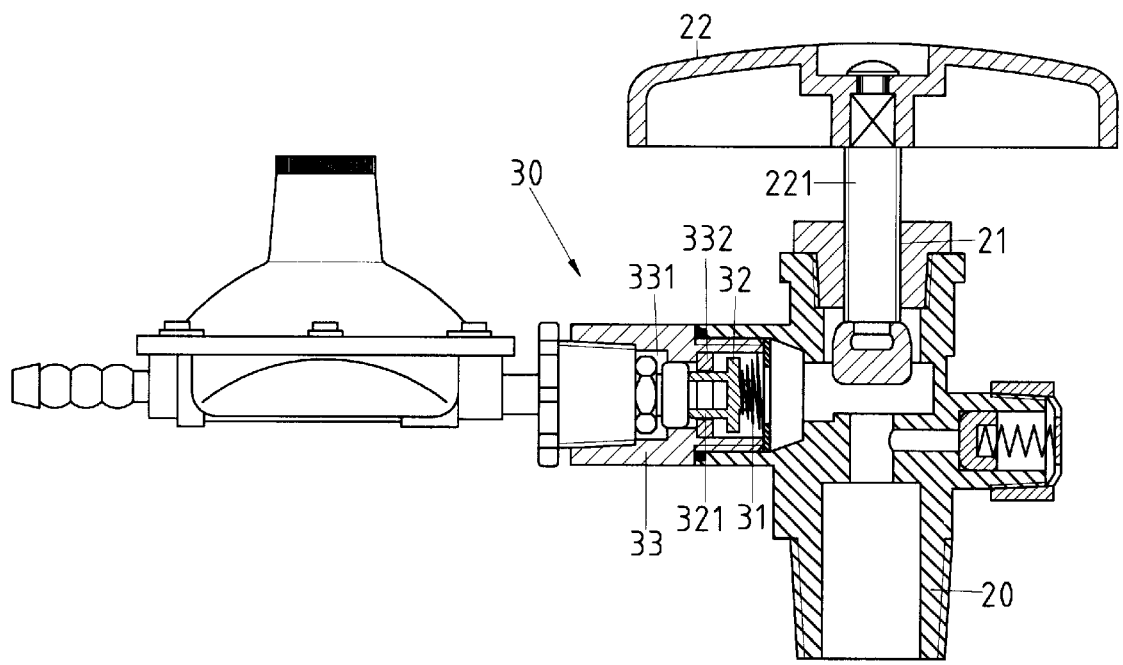
FIG. 7 shows a sectional schematic view of the present invention in use.

As shown in FIG. 6, the leakproof member 30 of the present invention is devoid of the elastic element 31 and is formed of the plug 32, the fastening body 33, and the locating body 34. The plug 32 is exerted on by the pressure of the gas flow 35, as indicated by arrows, such that the plug 32 is forced to press against the stop edge 332 of the through hole 331 of the fastening body 33, thereby preventing the gas leak.

I claim:

1. A gas tank on-off switch comprising:

a gas tank having an interior and a gas contained within said interior of said gas tank;

a main body fastened to said gas tank so as to be in fluid communication with said interior of said gas tank, said main body having a rotary handle for controlling a gas flow from said gas tank so as to be distributed outwardly from said main body;

a gas pipe connector; and a leakproof member having one end detachably fastened to said main body and having an opposite end fastened to said gas pipe connector, said leakproof member comprising:

a fastening body having a through hole extending therethrough and a stop edge formed in a wall of said through hole, said fastening body having one end connected to said gas pipe connector, said fastening body having an opposite end connected to said main body;

a plug having a protruded end and disposed in said opposite end of said fastening body, said protruded end of said plug extending through said stop end of said through hole of said fastening body;

an elastic element disposed in said opposite end of said fastening body such that one end of the said elastic element exerts an elastic force against said plug; and a locating body fastened to opposite end of said fastening body for retaining said elastic element of said plug within said fastening body.

2. The switch of claim 1, wherein said elastic element being a coil spring.

* * * * *